United States Patent

[11] 3,572,607

| [72] | Inventor | Harry D. Wilson<br>225 10th Ave., San Francisco, Calif. 94118 |
|---|---|---|
| [21] | Appl. No. | 729,138 |
| [22] | Filed | Apr. 22, 1968 |
| [45] | Patented | Mar. 30, 1971 |

[54] FISHING REEL
30 Claims, 7 Drawing Figs.

[52] U.S. Cl. .................................................. 242/218,
242/219
[51] Int. Cl. ...................................................... A01k 89/00
[50] Field of Search ............................................ 242/84.54,
84.44, 84.45, 84.46, 84.21; 192/94, 95; 242/84.5

[56] References Cited
UNITED STATES PATENTS

| 1,981,429 | 11/1934 | Scott | 242/84.5 |
| 1,981,430 | 11/1934 | Scott | 242/84.5 |
| 2,593,872 | 4/1952 | Gohde | 242/84.44UX |
| 2,648,506 | 8/1953 | Kirby | 242/84.45 |
| 2,711,292 | 6/1955 | Taggart et al. | 242/84.21 |
| 2,896,874 | 7/1959 | Nurmse | 242/84.45 |
| 2,977,065 | 3/1961 | Holahan, Jr. | 242/84.54 |
| 3,025,020 | 3/1962 | Sarah | 242/84.54X |

*Primary Examiner*—Stanley N. Gilreath
*Assistant Examiner*—Werner H. Schroeder
*Attorney*—Fryer, Tjensvold, Feix, Phillips & Lempio

ABSTRACT: A fishing reel comprises a handle and a clutch pressure plate mounted for rotation on an axle thereof. The drag on a spool, having a fishing line suitably wound thereon, may be varied within a predetermined range by manipulating the handle only. Rotation of the handle drives the pressure plate, a spring and a clutch sleeve which in turn impart drive to the spool via a slipping clutch.

Patented March 30, 1971
3,572,607
2 Sheets-Sheet 1
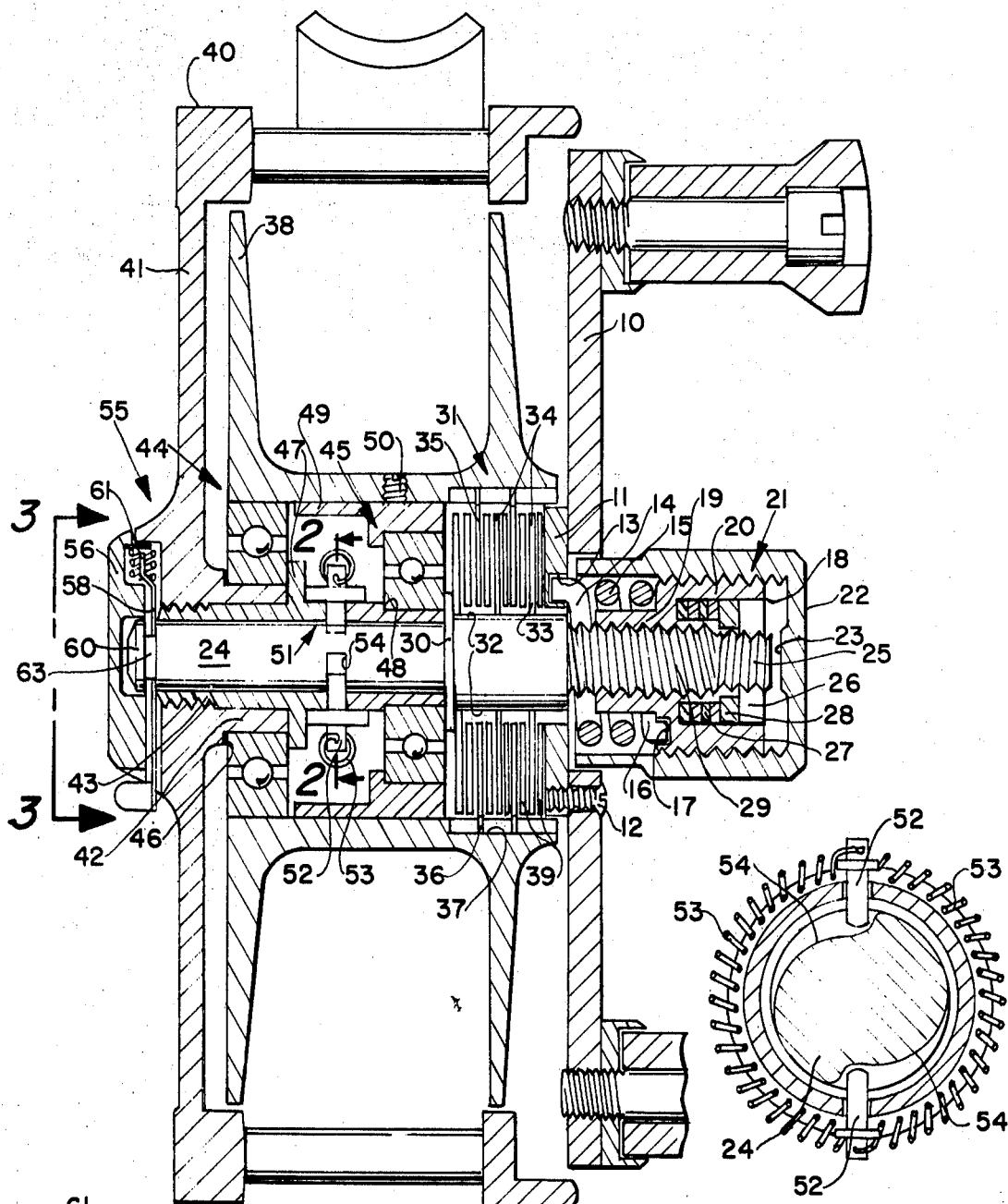
FIG. 1.
FIG. 2.
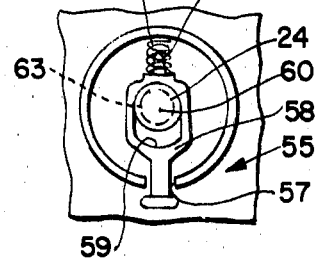
FIG. 3.
INVENTOR.
HARRY D. WILSON
BY
Fryer, Tjensvold,
Feix, Phillips & Lempio
ATTORNEYS Patented March 30, 1971 3,572,607
2 Sheets-Sheet 2
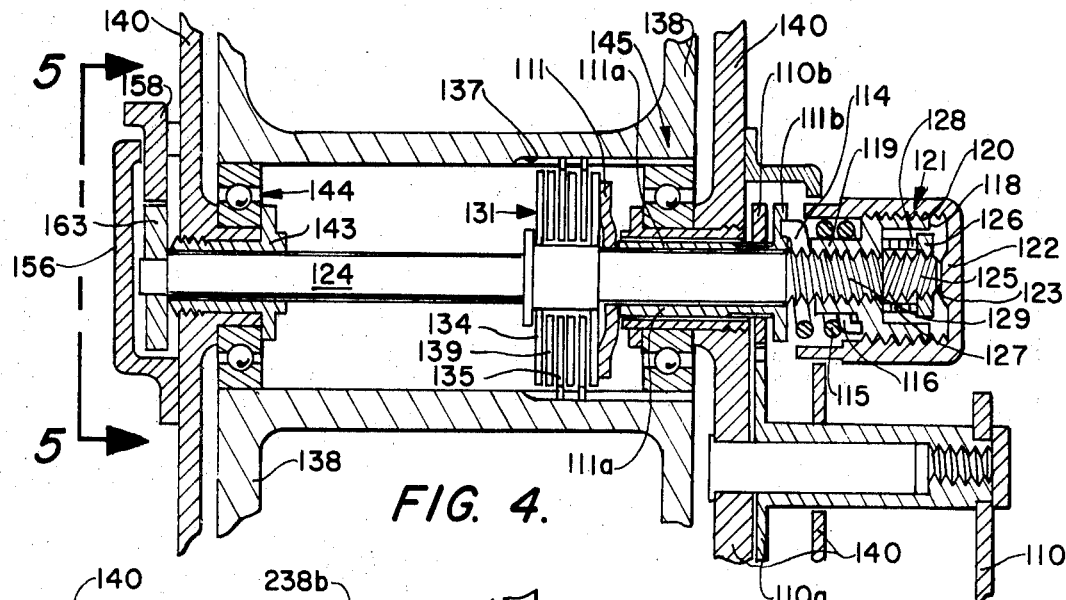
FIG. 4.
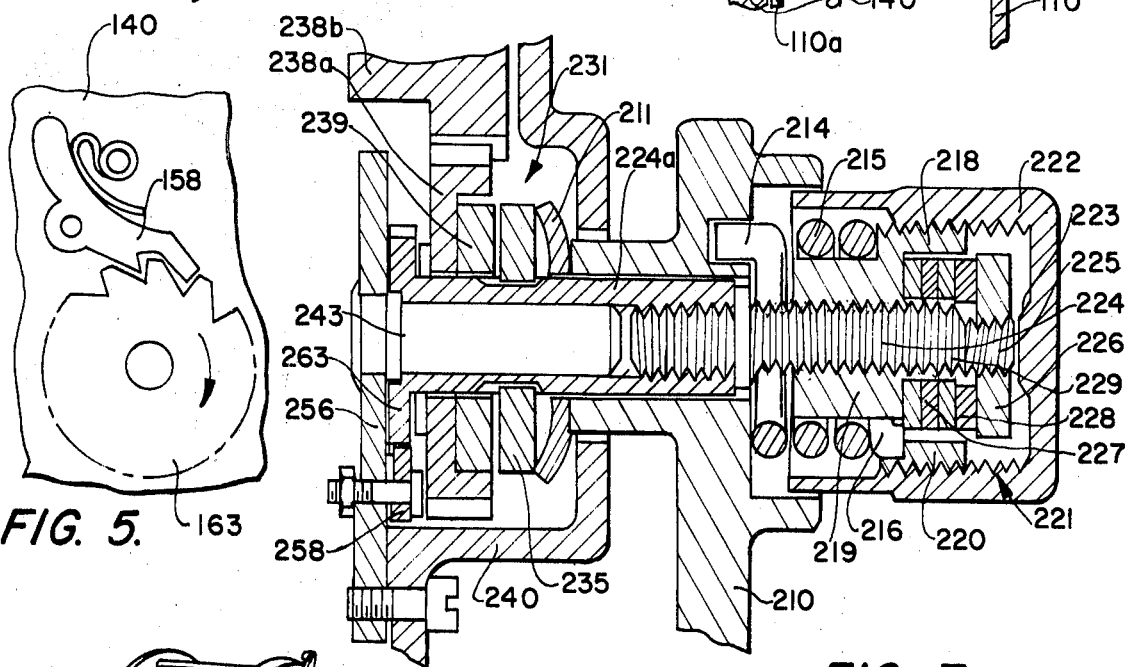
FIG. 5.
FIG. 7.
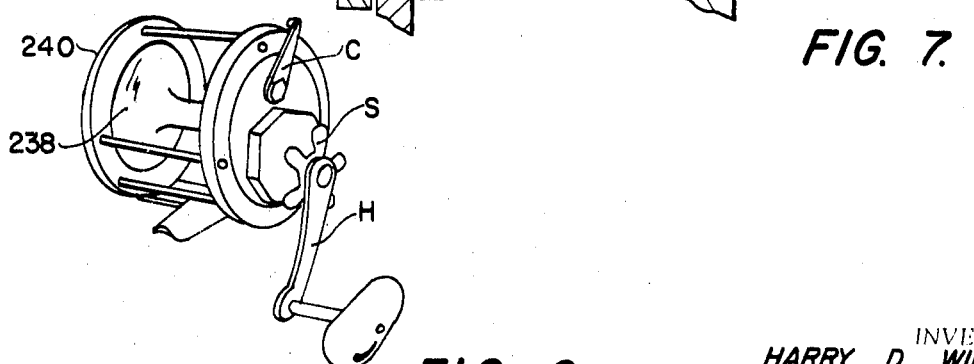
FIG. 6.
INVENTOR.
HARRY D. WILSON
BY
ATTORNEYS

FISHING REEL

BACKGROUND OF THE INVENTION

A common problem in the fishing arts is one of expeditiously changing and closely controlling the amount of line drag to properly "play" a fish. During a deep sea fishing excursion, for example, the inability to expeditiously reduce the drag a desired amount often results in a breaking of the line by a lunging fish. Conversely, the line cannot be played out too fast since an undue amount of line slack would also tend to lose the fish.

Conventional fishing reels normally employ a knob, latch or other suitable mechanism positioned adjacent to and actuated separately from the handle to control line drag. Thus, the fisherman must at least partially remove his hand from the handle in order to properly adjust such drag. Separate manipulation of the handle and the drag mechanism during this most critical phase of fishing gives rise to the possibility that the fish may not be properly "played" and thus lost.

An object of this invention is to overcome the above, briefly described problems by providing a fishing reel adapted to have the spool and line drag thereof preset at a predetermined range and thereafter controlled within such range via a power transmission means by manipulating the handle only. In the preferred and more specific embodiment, the handle is attached to a pressure plate of the power transmission means to selectively compress and relax a spring to vary the engagement of a clutch means and thus spool drag through the pressure plate. Means are preferably provided for adjusting the maximum drag setting whereat handle power is transmitted to the spool via at least two cooperating power paths.

Another object of this invention is to provide a noncomplex fishing reel which exhibits high structural integrity and can be expeditiously assembled and disassembled for servicing and like purposes.

A further object of this invention is to provide a power transmission adapted for use in a fishing reel, for example, for efficiently driving a rotating member via an axially movable clutch sleeve and compressible spring and clutch means.

A still further object of this invention is to provide a structurally durable and efficient hub assembly mounted in the housing of a fishing reel for providing trouble-free operation and long wear-life.

Further objects of this invention will become apparent from the following description and accompanying drawings wherein:

FIG. 1 is a longitudinal, cross-sectional view illustrating a first fishing reel embodiment of this invention;

FIG. 2 is a sectional view taken in the direction of arrows 2-2 in FIG. 1 illustrating a one-way clutch employed in the fishing reel;

FIG. 3 is a view taken in the direction of arrows 3-3 in FIG. 1 with an end cover removed for clarification purposes;

FIG. 4 is a longitudinal, cross-sectional view illustrating a second fishing reel embodiment;

FIG. 5 is a view taken in the direction of arrows 5-5 in FIG. 4;

FIG. 6 is an isometric view illustrating a conventional fishing reel; and

FIG. 7 is a cross-sectional view of a third fishing reel embodiment wherein a handle and transmission assembly are utilized to convert the FIG. 6 fishing reel to embody novel features of this invention.

FIG. 1 illustrates a first fishing reel embodiment of applicant's invention comprising power input means in the form of a handle 10 suitably attached to an annular clutch pressure plate 11 of a power transmission means by screws 12, for example. The pressure plate has a notch 13 formed on the outboard face thereof retaining a bent end portion 14 of a "right-hand" coil spring 15 therein. The other end of the spring has a similar bent portion 16 disposed in a notch 17 formed in a cylindrical clutch sleeve 18. The clutch sleeve preferably comprises a reduced neck portion 19 arranged concentrically within the spring and an enlarged portion 20.

The latter portion is threadably attached by right-hand threads at 21 to interior portions of a cup-shaped cap 22. The cap has a raised boss 23 formed therein and arranged in juxtaposed relationship with respect to the right end of an axle 24. A left-hand and reduced threaded portion 25 of the axle has a nut 26, flat washers 27 and lock washer 28 mounted thereon to adjust the limit of rightward axial movement of the clutch sleeve on the axle. Neck portion 19 of the clutch sleeve is mounted for limited travel on right-hand threaded portion 29 of the axle.

The axle has an annular flange 30 secured thereto to axially position a plurality of clutch discs of a slipping clutch means 31 between the flange and pressure plate 11. Diametrically opposed flat portions 32 are formed on the axle in a conventional manner to receive mating cutout portion 33 formed within a first set of disc-shaped washers 34. Thus, the washers may slide axially on the axle but are restrained from rotating relative thereto. A second set of washers 35 each have a plurality of radially projecting ears 36 suitably formed on the periphery thereof to engage axial slots 37 formed on interior portions of a power output means or circular spool 38.

Washers 39 are thus prevented from rotating relative to the spool but can move axially thereon. A third set of washers 39 are loosely mounted on the axle with each such washer disposed between a pair of washers 34 and 35 to be compressed therebetween when pressure plate 11 is moved leftwardly in FIG. 1. Thus, when the clutch means is compressed rotation of the axle 24 will impart rotation to washers 34 which in turn function to rotate washers 35 and spool 38 via washers 39. Washers 34 and 35 preferably comprise a metallic composition, such as stainless steel or brass, whereas washers 39 preferably comprise tetrafluoroethylene (Teflon) or other suitable material exhibiting like properties.

Spool 38 is rotatably mounted in a housing 40, partially shown in FIG. 1, to retain a fishing line thereon in a conventional manner. The housing comprises a disc-shaped end plate 41 having an inwardly directed annular sleeve 42 threadably securing a stationary hub 43 thereto. The sleeve and hub carry roller bearing assemblies 44 and 45 thereon, respectively, which in turn rotatably mount the spool on the housing. Shoulder 46, formed on the housing, and an annular flange 47 of the sleeve prevent axial movements of bearing assembly 44 whereas axial movements of bearing assembly 45 are restrained by a shoulder 48 of the sleeve and flange 30.

The upper bearing race for bearing assembly 45 may be attached to the spool by a sleeve 49, secured to the spool by a set screw 50. One-way brake means 51 (FIG. 2) comprises substantially diametrically opposed detents 52 compressed radially inwardly towards the longitudinal axis of axle 24 by coil springs 53. The inward ends of the detents are each adapted to engage slotted ramps 54 formed on axle 24 to permit the axle to be rotated clockwise, but not counterclockwise relative to the hub when viewed from the right end of the reel in FIG. 1. Other well-known forms of one-way brakes (e.g. ratchet and pawl or sprag type) could be utilized in lieu of the illustrated one.

A quick release means 55 FIGS. 1 and 3) is mounted on the left end of the reel to permit expeditious removal of the axle and attached power transmission means from the reel. Such release means is protected by a cover plate 56, removed in FIG. 3, having a slot formed therein (Not shown) cooperating with a slot 57 formed on the housing to retain and guide reciprocal movements of a release pin 58. The release pin has an aperture 59 formed therein to mount the pin on a head portion 60 of the axle. A coil spring 61 is mounted between the housing and a pronglike extension 62 of the pin to urge the pin downwardly.

Thus the upper portion of the pin will normally engage a neck portion or groove 63 formed in the axle to prevent the axle from moving axially rightwardly in FIG. 1. When pin 58 is moved upwardly aperture 59 will permit the axle to be moved rightwardly therethrough. Prior to such removal, handle 10 is properly positioned to release the axle from detents 52. In particular, the axle is rotated to move the detents radially outwardly to their fullest extent on the raised cam portions or largest diameter of the axle at the one-way brake.

The minimum and maximum drag settings for spool 38 will now be described with reference to FIG. 1, as viewed from the right side thereof. The minimum drag is set by first rotating cap 22 counterclockwise to prevent boss 23 from engaging axle 24 during the initial stages of such setting. Handle 10 is rotated clockwise while simultaneously holding spool 38 to prevent rotation thereof relative to the handle. Clutch spring 15 thus functions to drive clutch sleeve 20 leftwardly on right-hand threads 21 to compress the spring between the clutch sleeve and pressure plate 11. Clutch means 31 is thus compressed by the pressure plate to a full maximum drag setting for the reel which may be later reduced for normal fishing operations in a manner hereinafter described.

The line may be held by the left hand and the handle rotated counterclockwise by the right one to move the clutch sleeve rightwardly on axle 24 to relax spring 15 the desired amount to achieve the minimum drag setting on the line and spool as sensed by the operator. Cap 22 is then removed and locknut 26 tightened on the axle to prevent the clutch sleeve from moving rightwardly in operation past such minimum drag setting. The cap is replaced and rotated clockwise until boss 23 engages the right end of axle 24. The cap is then rotated counterclockwise, approximately one-half of a revolution for example, to prevent engagement between the boss and axle during a portion of such selected "mid-drag" range setting.

Thereafter, oscillation of handle 10 will function to infinitely vary the drag within such preset range as prescribed by the above minimum and maximum settings. In particular, manipulation of the handle will function to move clutch sleeve 18 axially on axle 24 to any desired position between extreme rightward and leftward positions as determined by the settings of locknut 26 and boss 23, respectively. It should be noted that rotation of handle 10 does not directly move pressure plate 11 axially to compress the clutch means as is true in many conventional reels. Rather, handle 10 applies an axial force to the pressure plate through the power transmission means comprising the clutch plate, spring 15 and clutch sleeve 20.

In operation and with cap 22 backed off to the "mid-drag" setting, rotation of the handle in a clockwise direction will function to drive the spool clockwise to retrieve the line thereon. The drag setting normally provides sufficient friction through a first power path, primarily occurring between pressure plate 11 and the first Teflon washer 39 abutting therewith, to rotate spool 38. A second power path occurs through the clutch sleeve and axle to the clutch means primarily due to frictional drag encountered at threads 29. Thus the line will be retrieved unless sufficiently high line resistance is encountered to prevent the spool from rotating.

When such resistance is encountered, continued rotation of the handle clockwise will function to actuate the pressure plate, clutch spring 15, clutch sleeve 20 and preset cap 22 to further compress the clutch spring to increase the drag setting towards maximum. When this added friction in the clutch means is insufficient to revolve the spool, the axle will cease rotation and discs 34 will not aid plate 11 in driving the spool. Thereafter, continued handle rotation in a clockwise direction will drive the clutch sleeve and preset cap leftwardly until boss 23 abuts the end of axle 24 to achieve the maximum drag setting.

The axle is thereby rotated by the boss to add a third cooperating power path to drive the spool. In particular, rotation of the handle now functions to rotate the axle and discs 34 of the clutch means via boss 23 of the cap. When the combined driving force of the three power paths is insufficient to overcome line resistance, slippage will occur in clutch means 31 to prevent the line from breaking. It can be seen that the maximum drag setting may be expeditiously increased to an arbitrary "full-drag" setting by merely rotating cap 22 counterclockwise the desired amount.

One full counterclockwise turn, for example, of the cap only from the "mid-drag" setting illustrated in FIG. 1 will function to increase the axial distance clutch sleeve 18 is permitted to move leftwardly on the axle. Thus, clockwise rotation of the handle will function to permit a fuller compression of the clutch and an increased maximum drag as dictated by engagement of boss 23 with the axle. During normal fishing operations nut 26 would not be disturbed unless a change in the minimum drag is desired. In particular, minimum drag is governed solely by the axial location of the locknut on the axle whereas maximum drag is governed by the axial position of cap 22 and boss 23. Indicia means (not shown) could be suitably formed on cap 22 to indicate the various maximum drag settings.

It can be seen that applicant's power transmission means provides a number of unique structures and desired functions. For example, the handle and pressure plate are freely mounted for rotation on the axle whereas conventional handles are normally threadably attached to a corresponding axle. In conjunction therewith, clutch sleeve 20 confines thread travel on threaded portion 29 of the axle separately from the handle to assure precise drag settings. In addition, the clutch sleeve provides a smoothly developed driving force for compressing coil spring 15 and the pressure plate. Also, this arrangement virtually eliminates backward handle "creep."

It should be further noted that the power transmission means comprises a self-contained closed circuit and clutching arrangement which greatly reduces damaging and wear-prone forces which are normally imparted to the spool and housing in conventional reel constructions. Also, the axle and transmission assembly can be expeditiously removed from the hub and spool for servicing or like purposes. In addition, hub 43 facilitates expeditious assembly and positive positioning of bearing assemblies 44 and 45 in the integrated reel. Furthermore, the bearing assemblies are mounted in the reel to assure maximum bearing concentricity and long wear life to the reel.

The above-described reel could be modified without departing from the scope of this invention. For example, suitably arranged Belleville time spring washers or a rubber washer could be substituted in lieu of spring or resilient means 15 to perform the various functions thereof. Also a radial flange could be secured or adjustably attached to axle 24 between pressure plate 11 and clutch sleeve 18 to perform the function of boss 23 which could be eliminated. In particular, such flange would limit leftward movement of the clutch sleeve to thus set maximum drag in the reel. It should be further understood that the teachings of this invention are applicable to other type reels, such as the spinning type.

FIG. 4 illustrates a second fishing reel embodiment of applicant's invention. The numerals depicting various components thereof are in the 100 series with the numbers in the 10 series depicting components corresponding to identically numbered components in FIGS. 1—3. A handle 110 has a tubular portion secured to a spur gear 110a which in turn drives a pinion gear 110b. The pinion gear is splined to a reciprocally mounted tubular sleeve 111a secured to an annular disc 111b.

A bend end portion 114 of a coil spring 115 is secured in a notch formed in the disc while a second end portion 116 of the spring is likewise secured to a clutch sleeve 120. A neck portion 119 of a clutch sleeve 118 is threadably mounted on right-hand screw threads 129 formed on an axle 124 whereas portion 120 thereof is threadably secured by right-hand threads at 121 to a cap 122. Left-hand threads 125 are formed on the axle to threadably mount a locknut 126 thereon. The nut cooperates with spacer washers 127 and lock washer 128 to selectively limit the maximum rightward movement of the clutch sleeve to thus set the minimum drag.

Boss 123 is formed on inside portions of the cap in juxtaposed relationship with respect to the right end of the axle. Sleeve 111a is free to reciprocate relative to gear 110b to normally abut a pressure plate 111. The pressure plate in turn functions to selectively compress discs 34, 35 and 29 of a clutch means 131 when the sleeve and disc 111b move leftwardly. A spool 138 is suitably mounted for rotation on a housing 140 by means of bearing assemblies 144 and 145. A hub 143 is secured to the housing and functions in a manner similar to hub 43 of the FIGS. 1—3 embodiment.

As more clearly illustrated in FIG. 5, a spring-biased pawl 158 is pivotally mounted on housing 140 to normally engage notches formed on the periphery of a ratchet wheel 163. Thus, the ratchet and pawl mechanism, normally covered by a plate 156 secured to the housing, functions as a one-way clutch in a conventional manner. In addition, the mechanism may be tripped manually to function as a quick-release means to facilitate expeditious removal of the axle and attendant transmission assembly.

In operation, rotation of handle 110 will function to impart rotation to gears 110a and 110b which in turn rotate sleeve 111a and pressure plate 111 via a first power path further comprising the left end of sleeve 111a which frictionally engages the plate. A second power path comprises disc 111b, spring 115, clutch sleeve 118, axle 124 and clutch discs 139. When boss 123 engages the right end of the axle during operation at the maximum drag setting, a third cooperating power path is achieved. It can be seen that the various minimum and maximum drag adjustments and operations can be accomplished in substantially the same manner as above described in connection with the FIGS. 1—3 embodiment.

FIG. 6 illustrates a conventional fishing reel of the rotating spool type which may be converted expeditiously to comprise novel features of applicant's invention. Such conventional reel may constitute, for example, the well-known Penn 310 Special Senator No. 112 manufactured by Penn Fishing Tackle Mfg. Co. The numerals depicting various components in FIG. 7 are in the 200 series with the numbers in the 10 series depicting components corresponding to like numbered components of the FIGS. 1—3 embodiment. As will be hereinafter explained, the FIG. 7 conversion unit enables the owner of a conventional salt water reel, having a standard star wheel mounted adjacent to the handle for adjusting drag, to convert such reel to one employing applicant's invention.

Handle 210 has a bent end portion 214 of coil spring 215 secured thereto with the other end portion 216 of the spring secured to a clutch sleeve 218. Reduced neck portion 219 of the clutch sleeve is threadably mounted on right-hand threads 229, formed on an axle 224, whereas enlarged portion 220 of the sleeve is attached by right-hand threads at 221 to a cap 222. Boss 223 is arranged to juxtapose the right end of the axle. Lock nut 226 and attendant spacer washers 227 and lock-washer 228 are arranged to fix the extent of rightward movement of the clutch sleeve of axle 224 to thus set minimum drag in the manner above described.

The left end of a tubular portion of handle 210, mounted for rotation on a hub 224a, abuts a Belleville spring washer 221 which functions as a pressure plate to selectively compress clutch means 231. The clutch means may comprise a slotted washer 235 suitably keyed to hub 224a for limited axial movements thereon. A friction washer 239 is loosely mounted on the hub to be compressed by pressure plate 211 and washer 235 to thus impart rotation to gears 238a and 238b in a conventional manner.

A one-way clutch comprising a pawl 258, pivotally mounted on a cover plate 256 attached to housing 240, functions to permit clockwise movement of hub 224a and to prevent retrograde movement thereof. The pawl is arranged to engage notches suitably formed on a ratchet wheel 263. The pawl and ratchet mechanism may be substantially similar to the one illustrated in FIG. 5. A stud 243, secured to stationary plate 256, rotatably mounts hub 224a thereon.

Conversion of the conventional reel illustrated in FIG. 6 to embody the FIG. 7 structures may be accomplished in the following manner. A handle H and star disc S, along with a spacing sleeve and attendant structures (not shown), are removed from the FIG. 6 reel. Axle 224 is inserted into housing 240 and suitably threaded into hub 224a. Handle 210 is slid over the axle and the tubular portion thereof urged into abutting relationship with pressure plate or washer 211 inside the housing.

Clutch spring 215 and sleeve 218 are then threaded onto the axle and spring portions 214 and 216 are properly seated into the notches formed in the handle and the clutch sleeve, respectively. The minimum and maximum drag setting are then accomplished in substantially the same manner as above described in connection with the settings for the FIGS. 1—3 reel. In particular, the axial position of locknut 226 and attendant washers will dictate minimum drag requirements whereas maximum drag will be governed by the distance boss 223 is separated from the right end of axle 224.

It can be seen that hub 224a has in effect become an extension of axle 224 and can rotate therewith in a clockwise direction on stud 243. Counterclockwise movement of the hub and the axle is prevented by the ratchet and pawl mechanism. Gear 238a is mounted for rotation on hub 224a and is in continuous mesh with gear 238b which in turn drives the spool in a conventional manner. Friction washer 239 is freely mounted on the hub and may be compressed between a face of gear 238a and washer 235 for spool driving purposes.

In order to retrieve the line, the handle is rotated in a clockwise direction as viewed from the right end of the reel in FIG. 7. When line resistance is encountered to prevent the axle from rotating, further handle rotation will drive the clutch spring and clutch sleeve leftwardly to thereby compress spring washer 211 against the clutch means via the tubular portion of the handle. Increased pressure on the clutch forces the washer 239 against gear 238a to rotate it clockwise.

The so-called "free spool clutch" lever C (FIG. 6) may be employed in a conventional manner to enable the operator to engage or disengage gears 238a and 238b. When the lever is tripped manually to its disengaged position via a suitable yoke mechanism (not shown), suitably attached to gear 238b, the spool is free to revolve and payout line, as in casting, while the handle remains stationary. Movement of the lever to its illustrated engaged position will condition the spool for normal, retrieving operations via the handle. The line may be retrieved with the FIG. 7 unit made operative for normal drag operation in the manner as described above.

I claim:

1. A fishing reel comprising a housing, a spool and a handle each mounted in said reel to rotate relative to said housing and power transmission means, including an axle, for selectively rotating said spool upon rotation of said handle, said power transmission means operatively connecting said handle to said axle and said spool for selectively rotating said spool and for infinitely varying the drag thereon and rotation thereof relative to rotation of said axle by said handle within a predetermined range in response to manipulation of said handle only and means for selectively setting maximum drag on said spool including adjustment means and means mounting said adjustment means in said reel for engagement with an end of said axle to set said maximum drag thereat.

2. The invention of claim 1 wherein said power transmission means comprises means operative to split the power caused by rotation of said handle into at least two cooperating power paths to drive said spool.

3. The invention of claim 2 wherein said power transmission means comprises means further operative to provide a third power path from said handle to said spool by engaging and driving an end of said axle when said handle is manipulated to achieve a maximum drag setting on said spool.

4. The invention of claim 1 further comprising means mounting said handle in said reel to constantly maintain said handle out of contact with said axle.

5. The invention of claim 1 wherein said power transmission means further comprises a compressible spring means operatively connected to said handle to be compressed thereby between preset minimum and maximum limits upon manipulation of said handle.

6. The invention of claim 5 wherein said power transmission means further comprises slipping clutch means operatively connected between said axle and said spool and wherein said spring means is positioned to selectively compress and relax said clutch means upon selective rotation of said handle.

7. The invention of claim 5 wherein said power transmission means further comprises a clutch sleeve operatively connected between said handle and said spring means and means mounting said clutch sleeve for controlled axial movements on said axle to selectively compress and relax said spring means upon manipulation of said handle.

8. The invention of claim 6 wherein said power transmission means further comprises a pressure plate mounted for axial movements of said axle, adjacent to said clutch means, and means attaching said handle to said pressure plate.

9. The invention of claim 7 further comprising means threadably mounting said clutch sleeve on said axle.

10. The invention of claim 1 further comprising means adjustably mounted on said axle for setting said minimum drag.

11. The invention of claim 1 wherein said power transmission means further comprises a clutch sleeve threadably mounted on said axle for axial movement thereon and wherein said adjustment means is adjustably mounted on said clutch sleeve for engaging an end of said axle when said handle is manipulated to achieve said maximum drag.

12. The invention of claim 1 further comprising one-way brake means operatively connected between said axle and said housing for permitting said axle to rotate in only one direction.

13. The invention of claim 1 further comprising quick-release means operatively associated with said axle for permitting manual release and removal of said power transmission means from said housing.

14. A fishing reel comprising a housing, a spool rotatably mounted on said housing, an axle rotatably mounted in said housing, a multiple-disc slipping clutch means operatively connected between said spool and said axle to rotate said spool upon rotation of said axle and compression of said slipping clutch means, a pressure plate positioned adjacent to said slipping clutch means, a handle attached to said pressure plate, a clutch sleeve threadably mounted on said axle exteriorly of said spool for axial movements relative to said axle, a coil spring mounted on said axle and attached to said pressure plate and to said clutch sleeve, adjustment means threadably attached to said axle and normally abutting said clutch sleeve to prevent axial movement therepast and away from said spring means and a cap threadably mounted on said clutch sleeve and having a boss formed thereon in juxtaposed relationship to a first end of said axle.

15. The invention of claim 14 further comprising a one-way brake means operatively connected between said axle and said housing.

16. The invention of claim 14 further comprising quick-release means releasably connected at a second end of said axle for selectively permitting said axle to be removed from said reel.

17. The invention of claim 14 further comprising a hub secured to said housing to rotatably mount said axle therein and spaced bearing assemblies rotatably mounting said spool on said hub.

18. The invention of claim 14 wherein alternate discs of said multiple-disc slipping clutch means comprise tetrafluoroethylene.

19. A transmission comprising a rotatably mounted axle having a longitudinal axis, power input means and power output means each rotatably mounted about said axis, variable engageable clutch means operatively connecting said axle to said power output means, a pressure plate attached to said power input means for rotation therewith and mounted about said axis to move axially to selectively compress said clutch means, a clutch sleeve threadably attached to said axle for axial movement thereon and resilient means connecting said pressure plate to said clutch sleeve for rotating said axle upon rotation of said power input means and for controlling the degree of engagement of said clutch means in response to the relative location of said clutch sleeve on said axle and adjustment means and means adjustably mounting said adjustment means on said clutch sleeve for engaging an end of said axle for selectively changing and setting maximum compression of said clutch means by said pressure plate.

20. The invention of claim 19 wherein said resilient means comprises a compressible coil spring.

21. The invention of claim 19 further comprising second adjustment means operatively associated with said axle for limiting axial movement of said clutch sleeve on said axle away from said resilient means for selectively changing and setting minimum compression of said clutch means by said pressure plate.

22. The invention of claim 19 wherein said transmission is mounted in a fishing reel, and wherein said power input means comprises a handle and said power output means comprises a spool.

23. In a fishing reel having a housing, an axle, a spool and a handle each mounted in said reel to rotate relative to said housing, and a variable engageable clutch means operatively connecting said axle to said spool, the invention comprising means operatively associated with said axle for rotating said axle and for simultaneously limiting the maximum engagement of said clutch in response to rotation of said handle only, including adjustment means and means adjustably mounting said adjustment means in said reel for engagement with an end of said axle for selectively changing and setting maximum compression of said clutch.

24. The invention of claim 23 wherein said first-mentioned means further comprises a clutch sleeve threadably mounted on said axle.

25. The invention of claim 24 wherein said first-mentioned means further comprises a compressible coil spring attached between said handle and said clutch sleeve.

26. The invention of claim 23 further comprising second adjustment means adjustably mounted on said axle for limiting the minimum engagement of said clutch.

27. The invention of claim 23 wherein said first-mentioned means comprises an annular pressure plate attached to said handle to rotate therewith on said axle and wherein said variable engageable clutch means is positioned adjacent to said pressure plate and operatively connectable between said axle and said spool in response to rotation of said handle and compression of said clutch means by said pressure plate.

28. The invention of claim 23 further comprising gear means operatively connected between said handle and said axle.

29. The invention of claim 23 further comprising gear means operatively connectable between said axle and said spool.

30. The invention of claim 29 further comprising a stud secured to said housing, a hub rotatably mounted on said stud and attached to said axle to rotate therewith.